United States Patent
Grimm et al.

(10) Patent No.: US 7,424,741 B1
(45) Date of Patent: Sep. 9, 2008

(54) METHOD AND SYSTEM FOR PREVENTION OF NETWORK DENIAL-OF-SERVICE ATTACKS

(75) Inventors: Martin Grimm, Suwanee, GA (US); Brad Barfield, Gainesville, GA (US); Eric Fritzges, Austell, GA (US); Hema Prasad, Alpharetta, GA (US); Robert R. Branum, Jr., Roswell, GA (US)

(73) Assignee: Cisco Technology, Inc., San Jose, CA (US)

( * ) Notice: Subject to any disclaimer, the term of this patent is extended or adjusted under 35 U.S.C. 154(b) by 859 days.

(21) Appl. No.: 10/152,541

(22) Filed: May 20, 2002

(51) Int. Cl.
*G06F 21/00* (2006.01)
*H04L 9/00* (2006.01)

(52) U.S. Cl. .................................. 726/22; 726/13
(58) Field of Classification Search ............... 713/151, 713/152, 171; 726/2, 11, 13, 22, 23
See application file for complete search history.

(56) References Cited

U.S. PATENT DOCUMENTS

| | | | | |
|---|---|---|---|---|
| 6,094,485 | A * | 7/2000 | Weinstein et al. | 380/30 |
| 6,799,202 | B1 * | 9/2004 | Hankinson et al. | 709/219 |
| 6,907,042 | B1 * | 6/2005 | Oguchi | 370/412 |
| 2002/0108059 | A1 * | 8/2002 | Canion et al. | 713/201 |
| 2002/0184489 | A1 * | 12/2002 | Mraz | 713/153 |
| 2003/0028803 | A1 * | 2/2003 | Bunker et al. | 713/201 |
| 2003/0145226 | A1 * | 7/2003 | Bruton et al. | 713/201 |

OTHER PUBLICATIONS

A. Juels et al., "Client Puzzles: A Cryptographic Countermeasure Against Connection Depletion Attacks," in S. Kent, editor, *Proceedings of NDDS '99 (Networks and Distributed Security Systems)*, pp. 151-165, 1999.
D. Dean et al., "Using Client Puzzles to Protect TLS," 10th Annual USENIX Security Symposium, 2001.

* cited by examiner

*Primary Examiner*—Gilberto Barron, Jr.
*Assistant Examiner*—Abdulhakim Nobahar
(74) *Attorney, Agent, or Firm*—Hickman Palermo Truong & Becker LLP

(57) ABSTRACT

An approach for preventing denial-of-service attacks on Secure Sockets Layer ("SSL") protocol is described. Queues are generated for handshake state connections and data transmission connections. A connection object representing a new SSL connection is time-stamped as it enters the handshake portion of the SSL protocol. A connection pointer to the connection object is placed at the head of the handshake queue. As new SSL messages are transferred between client and SSL server, the time-stamp is updated when the entire message is received, the connection pointer is repositioned to the head of the queue. A timer event periodically surveys the queues. If connection packet transmission gaps remain below a specified maximum handshake gap time, a connection is allowed to progress to the data transmission state. If any connection exceeds the specified gap time, the SSL connection is dropped.

50 Claims, 4 Drawing Sheets

METHOD AND SYSTEM FOR PREVENTION OF NETWORK DENIAL-OF-SERVICE ATTACKS

FIELD OF INVENTION

The present invention relates generally to security aspects of network communications. The invention relates more specifically to a method and system for prevention of Secure Sockets Layer ("SSL") denial-of-service attacks in communication networks.

BACKGROUND OF INVENTION

The Internet, in servicing the demands of millions of users, has introduced security concerns of a new magnitude by making a single computer potentially vulnerable to attack from many millions of geographically dispersed users. Even if a server is effectively protected against intrusive security breaches, it may still be vulnerable to a range of denial-of-service attacks, such as connection-depletion attacks. A connection-depletion attack is one in which the attacker seeks to initiate and leave unresolved a large number of connection (or service) requests to a server, exhausting its resources and rendering it incapable of servicing legitimate requests. The Secure Sockets Layer ("SSL") protocol is potentially vulnerable to such serious connection-depletion attacks.

The Secure Sockets Layer (SSL) protocol, a network communication protocol originally defined by Netscape Communications Corporation, and improvements such as Transport Layer Security ("TLS"), provide ways for a client to communicate with a server in a confidential or secure manner over a public network. In basic terms, SSL involves negotiating an encryption method between the client and server, and then encrypting data that is subsequently communicated among the client and server using the negotiated encryption method. In this context, "client" refers to an end station device that receives network services, such as a workstation, personal computer, personal digital assistant, etc., and "server" refers to a processing device that provides network services to one or more clients, such as a server-class computer, mini-computer, mainframe, etc. The client and server may be peers.

SSL communications among a client and server happen in two distinct phases called a "handshake phase" and a "data transmission phase." In the handshake phase, the client and server communicate information that negotiates agreed-upon security parameter values. In basic terms, the handshake phase is carried out because the client and server initially do not know or trust one another and therefore must negotiate a way to encrypt communications among them. In the data phase, the client or server (a "party") encrypts information using the agreed-upon security parameter values and sends it to the opposite party, which decrypts it using the security parameters. An alert phase is also defined for identifying and reporting certain errors that occur in the other phases.

The SSL protocol is susceptible to denial-of-service attacks as it does not provide a timeout for any portion of its connection, during either the handshake or the data transmission state. An attack on a secure socket layer (SSL) server can be created such that the server will lose resources and eventually deny all legitimate traffic. The attack could involve:

1) sending a short but otherwise correct SSL header, thereby creating a legitimate Transmission Control Protocol ("TCP") connection, but an SSL connection in the process of a handshake;

2) at any stage of the SSL connection setup, SSL messages are no longer sent and the TCP connection is kept alive by probing, so that the handshake phase does not complete;

3) an SSL connection completes the full SSL handshake, but the attacker probes the TCP connection to keep it alive without sending any data, thereby burdening that connection resource and creating the impression that the connection is simply slow;

4) the attacker purposely creates many such very slow connections until the server cannot support any more connections.

In any of the above scenarios, the connections will not time out via TCP or SSL, causing all connection resources to be used. This will effectively deny the use of the server to any legitimate user.

A previous approach addressing denial-of-service hacker attacks has been the use of RSA puzzles, developed by RSA Security, Inc. of Bedford, Mass. This peer verification process using client puzzles is designed to allow servers to accept connection requests normally when there is no evidence of attack, but during an attack would only selectively accept requests. Specifically, the server would hand out to each client making a request a unique "client puzzle"—a cryptographic problem formulated using the then-current time, and other information unique to the server and client. In order to have resources allocated for a specific connection, the client must submit to the server a correct solution to an individual puzzle deployed with conventional timeouts on server resources. During an attack, legitimate clients would experience only a small degradation in connection time, while the attacking party would require vast computational resources to sustain an interruption of service. As a result, the subsequent burden of numerous requests, placed back on the attacking party, would severely limit its ability to continue the attack.

However, a limitation of this approach is that it requires modifications to existing standardized SSL protocols, as opposed to working with existing protocols. A company implementing an RSA solution would either need to update or attain entirely new SSL server software.

Based on the foregoing, there is a clear need to provide a solution to prevent attackers attempting to deny service to SSL servers by creating purposely slow connections.

In particular, there is a need for a solution that uses minimal computational resources while maintaining flexibility for users.

There is also a need for a method for prevention of denial-of-service attacks that will not require reconfiguration of existing SSL protocols.

SUMMARY OF THE INVENTION

The foregoing needs, and other needs and objects that will become apparent for the following description, are achieved in the present invention, which comprises in one embodiment, a method and system for prevention of denial-of-service attacks in Secure Sockets Layer ("SSL") protocol is described.

An approach for preventing denial-of-service attacks on SSL protocol is described. In one embodiment, a first queue for handshake state connections and a second queue for data transmission state connections are generated. Data associated with an SSL protocol connection is received from a client. A connection object associated with the data is created. As the SSL protocol connection enters handshake phase and data transmission phase processing, the connection object to the first queue and second queue is queued. The SSL protocol connection from the handshake queue or data transmission queue is dropped when a then-current gap between receiving successive client packets associated with the connection exceeds a specified maximum allowable gap time.

In one aspect of this embodiment, a timestamp is placed on the connection object upon entering a handshake portion of SSL protocol processing. A connection pointer to the connection object is placed at the head of the handshake queue. A connection in the handshake queue is allowed to proceed to the data transmission queue based on user-configured handshake gap times.

In another embodiment, when generating a queue for handshake state transmissions, information is received defining a maximum depth of the first queue and defining a maximum time gap between packet transmissions in the handshake state. When generating a queue for data transmission state connections, information is received defining a maximum depth of the first queue and defining a maximum time gap between packet transmissions in the data transmission state. When placing a time-stamp on the connection object, a start time value is obtained when a first connection object is received at a head of the handshake queue.

In another feature of this embodiment, the start time value when additional packets associated with the connection are received. The connection pointer is repositioned to the head of the queue when additional connection objects enter the head of the handshake queue.

The first and second queues are periodically surveyed from tail to head. A connection transmission gap value comprising the difference between the current time value of the timer event and the start time value. When allowing a connection to proceed from the handshake queue to the data transmission queue, the specified gap time value is compared with the connection transmission gap value. If the connection transmission gap value is less than the configured gap time value, the connection is allowed to proceed to the data transmission queue. When dropping a connection, the user-defined gap time value is compared with the connection transmission gap value; if the connection transmission gap value is greater than the configured gap time value, dropping the connection.

The SSL server issues a fatal alert when the connection is dropped. In one feature of this embodiment, when the first queue is full is determined. The least used connection in the first queue is dropped, and if no connections exist in the first queue, when the second queue is full is determined. The least used connection in the second queue is then dropped. When determining when the queues, a specified depth value is compared with a number of connection objects in the queues.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and system for prevention of denial-of-service attacks in a Secure Sockets Layer ("SSL") protocol is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

According to an embodiment, a system and method are provided to prevent denial-of-service attacks in Secure Sockets Layer ("SSL") protocol.

The system and method may be implemented as part of an SSL processing module in a device or server that receives and terminates SSL connections. For example, the system and method may be implemented using a router, switch, firewall or gateway that terminates SSL connections. Implementation mechanisms may include one or more computer programs or other software elements, firmware, ASICs or other hardware, or a combination of the foregoing.

Figure 1:
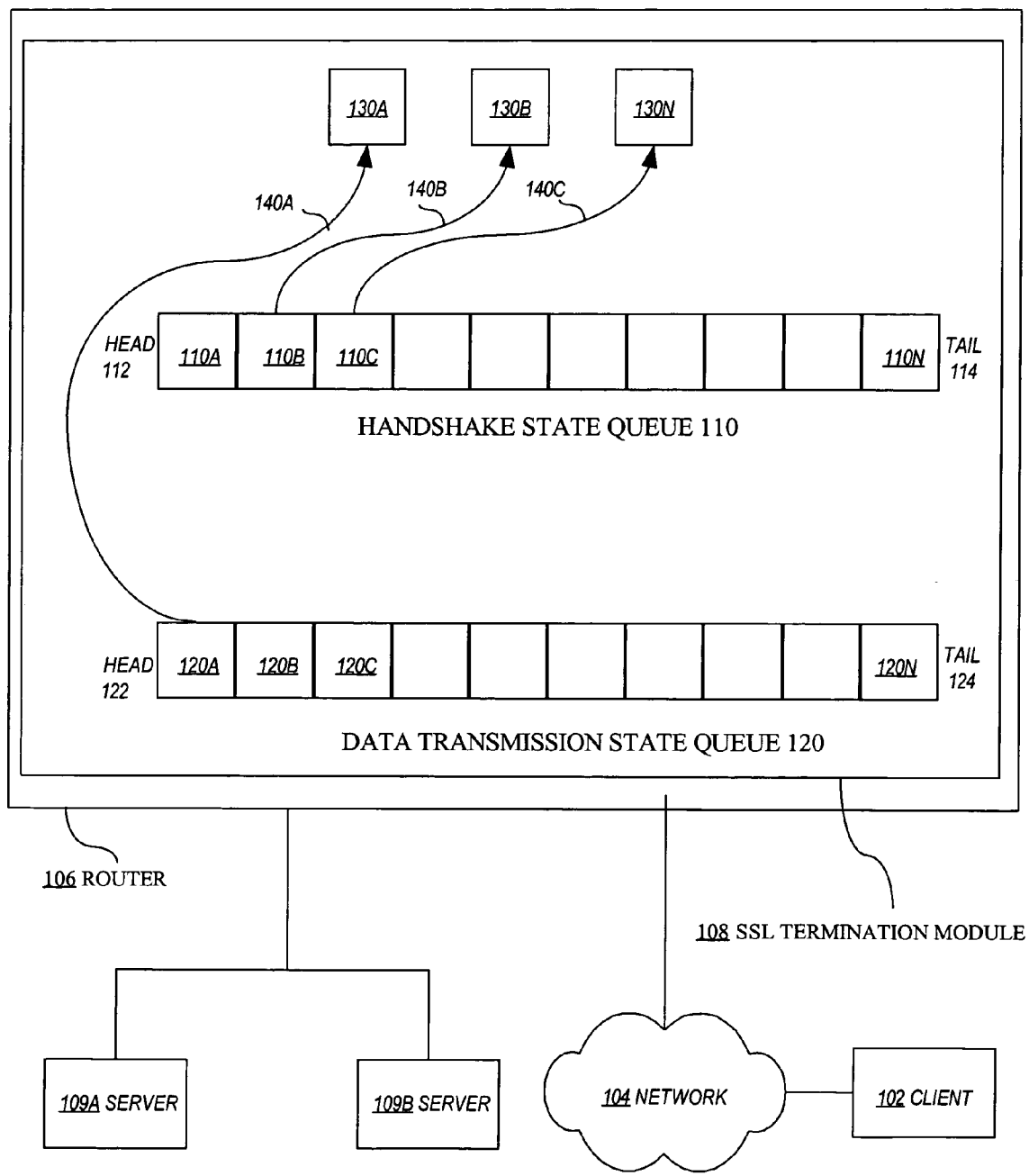
FIG. 1 is a block diagram illustrating a system for preventing denial-of-service attacks in SSL protocol.

FIG. 1 is a block diagram illustrating a system for preventing denial-of-service attacks in SSL protocol. A client 102 is communicatively coupled through a network 104 to a router 106. One or more servers 109A, 109B, which hold content that is needed by client 102, are communicatively coupled to router 106. In this arrangement, client 102 initiates one or more SSL connections to servers 109A, 109B, which connections are terminated by router 106. Network 104 may comprise one or more local area networks, wide area networks, internetworks, or a combination thereof, and may comprise the global internetworks known as the "Internet."

Router 106 includes an SSL termination module 108, implemented in software, hardware, or a combination thereof, responsible for receiving client connection requests, terminating the connections, and carrying out SSL encryption and decryption processing.

In general, FIG. 1 illustrates two least recently used queues, a handshake state queue 110 for connections in the handshake state and a data transmission state queue 120 for connections in the data transmission state. The depth of queues 110, 120 is configured by a user such as a network administrator or programmer. The depth is the maximum number of allowable connections on the configured SSL server or server virtual proxy. Thus, the depth is the maximum number of entries that the queues, when added together, can have.

Handshake state queue 110 comprises one or more queue entries 110A, 110B, 110C, etc., and has a head 112 and a tail 114. Data transmission state queue 120 comprises one or more queue entries 120A, 120B, 120C, etc., and has a head 122 and a tail 124. Each queue entry comprises a pointer to a connection object 130A, 130B, 130N, etc., that represents an SSL connection. An entry also may have a null value, meaning that the entry is not associated with any SSL connection.

The user determines, through Web traffic analyses, the maximum gap time between valid packet transmissions for connections in the handshake state, without inadvertently denying service to legitimate users with slow connections. In this context, "gap time" refers to a period between arrival at SSL termination module 108 of successive packets of legitimate connection requests. The user also calculates the maximum time gap between data packet transmissions for connections in the data transmission state. These time calculations are configured on a SSL server such as router 106, and may represent various policy decisions. For example, the user has the ability to limit either new or current clients. The user may give greater priority to those clients entering the handshake phase. In the alternative, a user may assign a greater priority to current clients and eliminate new users.

When a new SSL connection is initiated, a connection object 130 is instantiated and time-stamped as the connection enters the handshake portion of the SSL protocol. Time-stamping a connection object comprises obtaining a start time value when a first connection object is received in the handshake phase. A connection pointer 140 to the connection object 130A is placed in entry 110A at the head 112 of the handshake queue 110. As new connections are initiated, connection pointer 140 is moved to successive queue entries 120B, 120C toward tail 124, and pointers for the new connections are places at the head of queue 120. SSL messages are transferred between the client and SSL server for connection 130A. The time-stamp of connection object 130 is updated when the entire message is received. The connection object 130A and the associated connection pointer 140 is repositioned to the head of the queue.

A timer event periodically surveys queues 110, 120 from tail 114, 124 respectively to head 112, 122 respectively. The timer event obtains a connection transmission gap value, comprising the difference between the then-current time value and the start time value obtained from the time-stamp. The timer event checks the queues 110, 120 from tail to head for connections that have exceeded the allowed transmission gap values.

If the connection transmission gap values remain below the user-configured maximum handshake gap time, the connection represented by connection object 130 is allowed to progress to the data transmission state 120. In this embodiment, the connection pointer 140 is placed at the head of the data transmission queue 120. If any connection exceeds the gap time configured for handshake state, the SSL connection is dropped by the server, and a fatal alert message is returned to the client 102. The fatal alert message may be one of those defined in the SSL protocol.

A similar process occurs for connections that are in the data transmission state. If for any reason the maximum allowable connection transmission gap value is exceeded in the transmission state, the connection is dropped via a fatal alert. Legitimate connections continue to transfer data, and as new transmissions are received by the server, the connection timestamp is updated when the entire message is received, and the connection pointer is moved to the head of the queue.

A determined attacker could, by experimentation, determine the defined latency gaps. The attacker could then flood the server with connections with transmissions timed to be emulating legitimate users, by transferring handshake message packets or data packets under the configured transmission gaps, effectively blocking all other users. Therefore, in another embodiment, when either the handshake queue 110 or data transmission queue 120 becomes full, such that the depth configured would be exceeded when a new connection is added to the head of each queue, the slowest or least used connection is dropped. Determining when the queues 110, 120 are full comprises comparing the user-configured depth with the number of connection objects 130A, 130B, etc. If the number of connection objects 130A, 130B, etc. is greater than the configured depth, the queue 110, 120 is full, and the least used connections are dropped by sending a fatal alert.

With respect to priority, any connection in the handshake state is dropped first because it is incomplete and does not involve data transmission. If all connections are in the data transmission state, then the least used connection object in the data transmission queue is dropped when the data transmission queue 120 is full. This is important because the determined attacker may have potentially hijacked all available resources, and no legitimate users can address the server.

Figure 2:
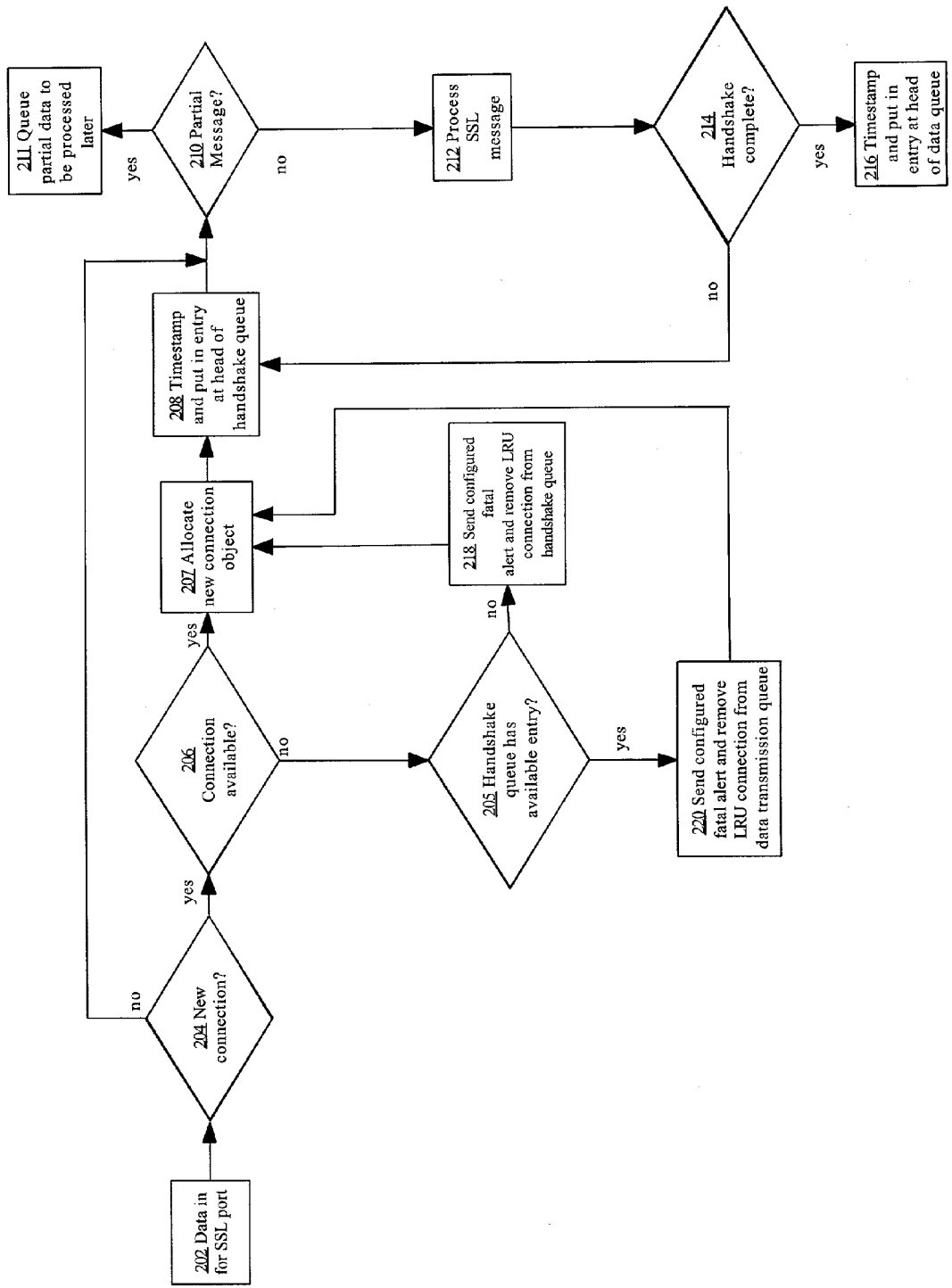
FIG. 2 is a flow diagram illustrating a method for preventing denial-of-service attacks in SSL protocol.

FIG. 2 is a flow diagram illustrating a method of preventing a denial of service attacks in SSL protocol.

In block 202, an SSL message is sent from the client to the SSL server. For example, client 102 (FIG. 1) initiates an SSL connection with a message to router 106. In block 204, it is determined whether the connection is new. If the connection is new, in block 206, it is determined whether a connection is available. If a connection is available, a new connection object is allocated and time-stamped in block 207 and block 208. A connection pointer is placed at the head of the handshake queue.

In block 210, it is determined whether the SSL message that was received is a partial message. If so, in block 211, the partial data is queued to be processed later. If the message is not a partial message, in block 212, the SSL message is processed in conventional manner.

If the handshake portion is complete in block 214, then the message is time-stamped, and a pointer to the associated connection object is placed in an entry at the head of the data queue (block 216). If the handshake portion is not complete, control passes to block 208, in which the connection object is time-stamped, and its associated connection pointer is repositioned to the head of the handshake queue.

Referring again to block 204, if no connection is available and the handshake queue is not empty in block 205, a fatal alert message is sent from the handshake queue in block 218. This message is sent because a new connection has been requested, no new connection object is available, and the handshake queue has no free space. Further, the least recently used connection is removed from the handshake queue in order to create space. If the handshake queue is empty, then a fatal alert is sent from the data transmission queue (220), and the least recently used connection is removed from the data transmission queue.

Figure 3:
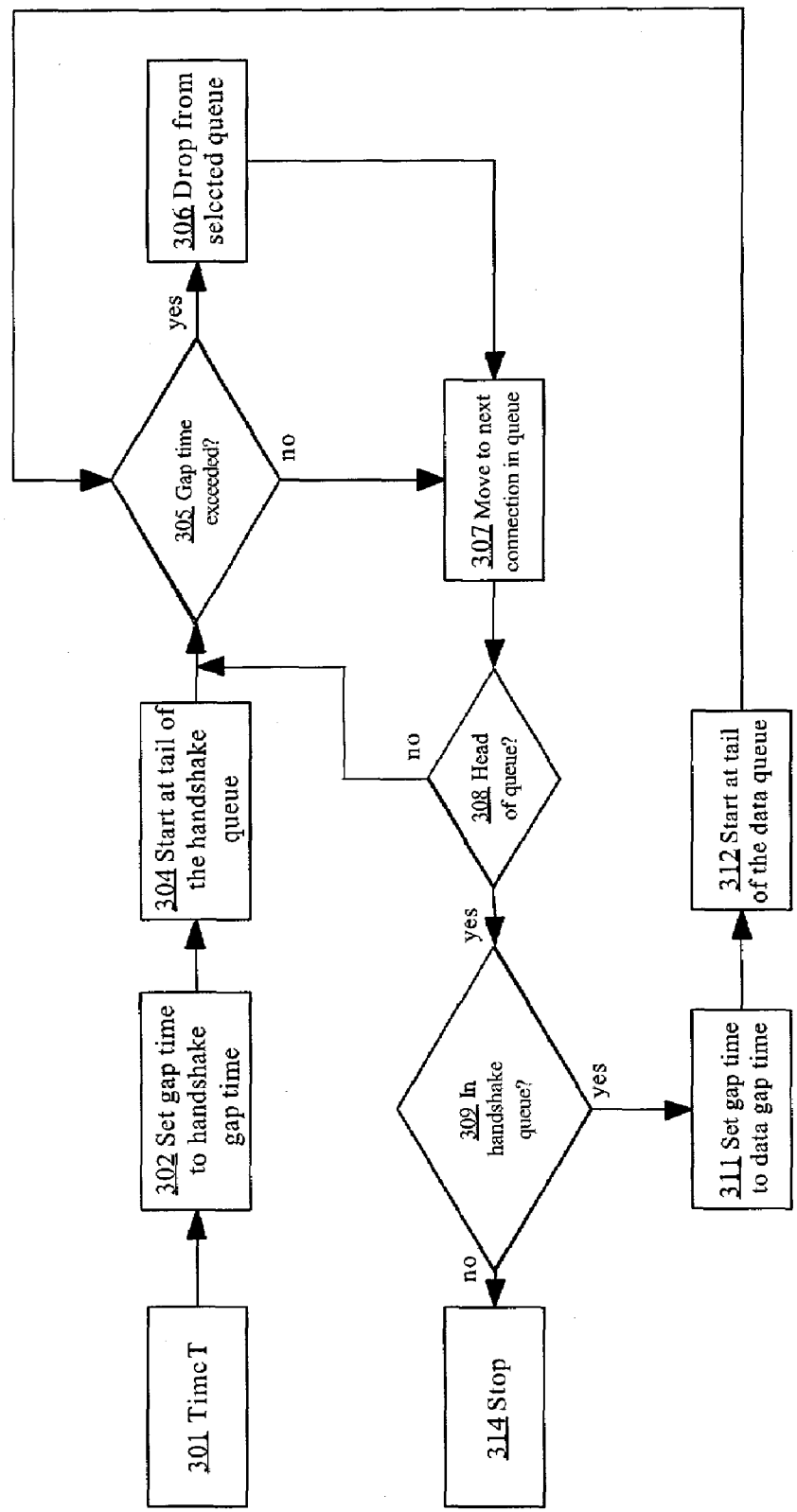
FIG. 3 is a flow diagram illustrating a timer event which periodically surveys the handshake and data transmission queues.

FIG. 3 is a flow diagram illustrating a process that may be used by timer event which periodically surveys the handshake and data transmission queues. The process of FIG. 3 is initiated periodically by the SSL server, for example, at time T as shown in block 301.

In block 302, a gap time value is set to the configured handshake gap time value. The handshake queue 110 is surveyed from tail 114 to head 112 by the timer event in block 304. In block 305, it is determined whether the configured gap time has been exceeded by any connection of a connection object that is pointed. If so, the connection is dropped from the selected queue in block 306. In this context, "selected queue" means either handshake queue 110 or data transmission queue 120. If not, the timer event moves to the next connection in the queue in block 307.

If the next connection is positioned at the head of the handshake queue (block 308 and block 309), the gap time is set to the configured data gap time (block 311), and the timer event proceeds to survey the data transmission queue from tail to head (block 312) in the same way. In this manner, all unreasonably slow connections are systematically removed from both queues. Processing ends at block 314.

Implementations of a method preventing SSL denial-of-service attacks provide the user with control over the maximum connections per server or proxies virtual, the packet transmission gaps between SSL messages, and the alert type to send to a connection when dropped. Further, the user is able to control the priority of which queue is used to drop the least used connection when the depth is exceeded.

When a connection object is dropped, a fatal alert is issued by the server. In one specific embodiment, the alert generated when the connection is closed in the handshake state is the handshake_failure alert. The alert generated when the connection is closed in the data transmission state is the close_notify alert.

With respect to closure alerts, the client and server may share knowledge that the connection is ending in order to avoid truncation attacks. The truncation attack allows an attacker to stop the SSL session without the server or client knowing that the session was stopped by an attacker instead of by the other party. If the attacker knows something about the structure of the message and how it is sent in the SSL packets, he can use the truncation attack to change the meaning of the message. Either party may initiate the exchange of closing messages. The close_notify message is a type of closure alert which notifies the recipient that the sender will not send any more messages for the associated connection.

With respect to error handing in the SSL handshake protocol, when an error is detected, the detecting party sends a message to the other party. Upon transmission or receipt of a fatal alert message, both parties immediately close the connection. Servers and clients are required to forget any session-identifiers, keys and secrets associated with a failed connection. Reception of a handshake_failure alert message indicates that the sender was unable to negotiate an acceptable set of security parameters given the options available; this is a fatal error.

Figure 4:
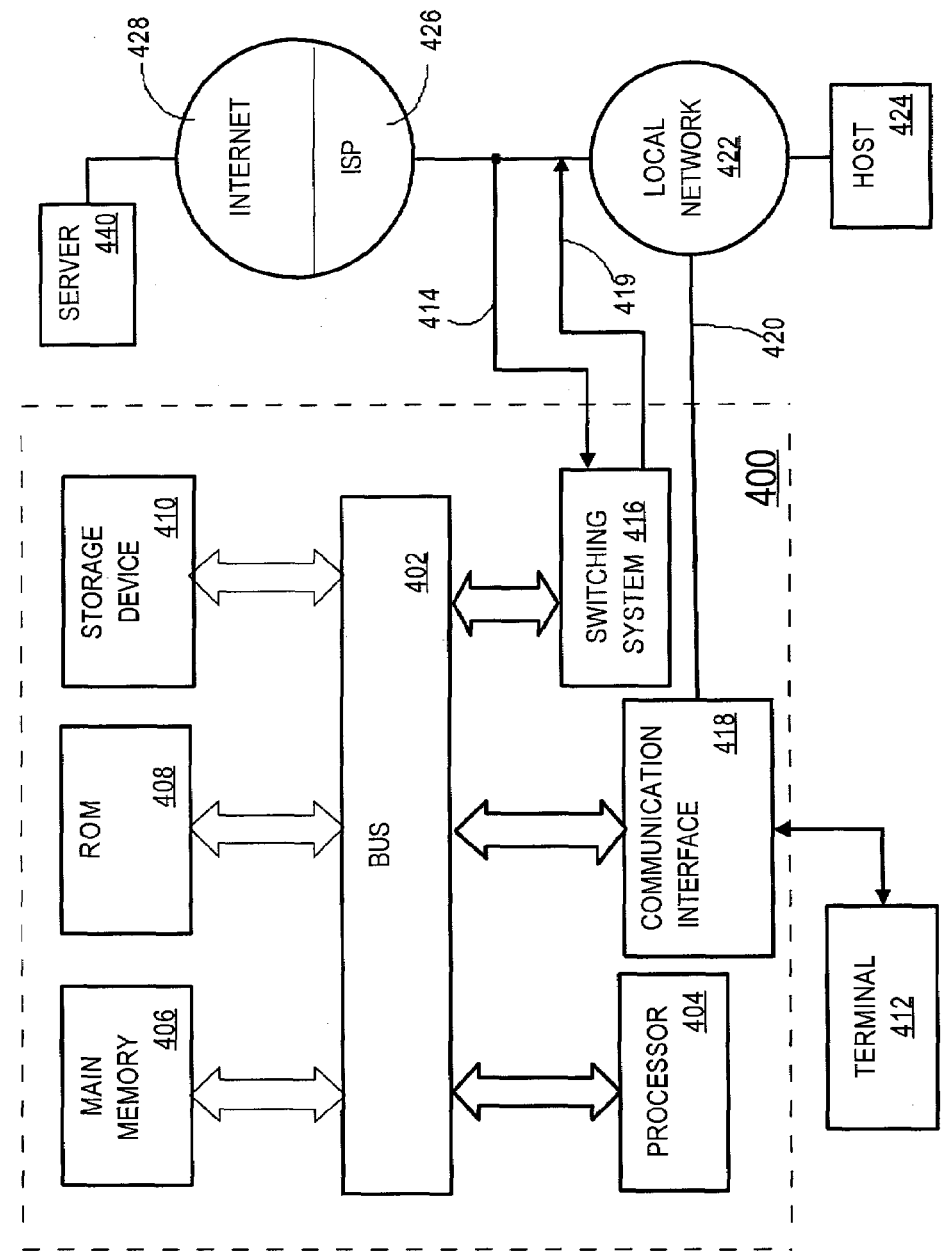
FIG. 4 is a block diagram of a computer system on which aspects of the invention may be implemented.

FIG. 4 is a block diagram that illustrates a computer system 400 upon which an embodiment of the invention may be implemented.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for preventing denial-of-service attacks in Secure Sockets Layer ("SSL") protocol comprising the computer-implemented steps of:
   generating a first queue that is dedicated to handling only SSL connections that are in the handshake state;
   generating a second queue that is dedicated to handling only SSL connections that are in the data transmission state;
   receiving data associated with an SSL protocol connection from a client;
   creating a connection object associated with said data;
   queuing the connection object to the first queue as the SSL protocol connection enters handshake phase processing;
   queuing the connection object to the second queue when the SSL protocol connection enters data transmission phase processing; and
   dropping the connection object from said first queue or said second queue when a time between receiving successive client packets associated with the connection exceeds a specified maximum allowable gap time.

2. The method as recited in claim 1 further comprising placing a timestamp on said connection object upon entering a handshake portion of SSL protocol processing.

3. The method as recited in claim 1 further comprising placing a connection pointer to said connection object at a head of said first queue.

4. The method as recited in claim 1 further comprising allowing a particular connection in said first queue to proceed to said second queue based on one or more user-configured handshake gap time values.

5. The method according to claim 1 wherein the step of generating a first queue for handshake state connections comprises:
   receiving information defining a maximum depth of the first queue; and
   receiving information defining a maximum gap time between packet transmissions in the handshake state.

6. The method according to claim 1 wherein the step of generating a second queue for data transmission state connections comprises:
   receiving information defining a maximum depth of the second queue; and
   receiving information defining a maximum gap time between packet transmissions in the data transmission state.

7. The method according to claim 2 wherein the step of placing the timestamp on said connection object comprises obtaining a start time value when a first connection object is received at a head of the first queue.

8. The method according to claim 1 further comprising:
   placing a timestamp on said connection object upon entering a handshake portion of SSL protocol processing, wherein placing the timestamp on said connection object comprises obtaining a start time value when a first connection object is received at a head of the first queue;
   when additional packets associated with the connection are received:
      updating the start time value; and
      repositioning a connection pointer associated with the connection object to the head of the corresponding queue.

9. The method according to claim 8 further comprising the steps of:
   periodically surveying said first and second queues from tail to head; and
   determining a connection transmission gap value comprising the difference between the current time value and said start time value.

10. The method according to claim 4 wherein the step of allowing a connection to proceed from the first queue to the second queue comprises the steps of:
    comparing a user-configured handshake gap time value with a transmission gap value of said connection; and
    if said connection transmission gap value is less than said user-configured gap time value, allowing the connection to proceed to said second queue.

11. The method according to claim 4 wherein the step of dropping a connection comprises the steps of:
    comparing a user-configured gap time value with a transmission gap value of said connection; and
    if said connection transmission gap value is greater than said user-configured gap time value, dropping the connection.

12. The method according to claim 1 wherein the step of dropping the connection comprises issuing a fatal alert.

13. A method as recited in claim 1, further comprising:
    determining when said first queue is full;
    dropping the least used connection in the first queue;
    if no connections exist in said first queue, determining when said second queue is full;
    dropping the least used connection in the second queue.

14. The method of claim 13 wherein the step of determining when said queues are full comprises comparing a specified depth value with a number of connection objects in said queues.

15. A computer-readable storage medium storing one or more sequences of instructions for preventing denial-of-service attacks in SSL protocol, which instructions, when executed by one or more processors, cause the one or more processors to perform:
    generating a first queue that is dedicated to handling only SSL connections that are in the handshake state;
    generating a second queue that is dedicated to handling only SSL connections that are in the data transmission state;
    receiving data associated with an SSL protocol connection from a client;
    creating a connection object associated with said data;
    queuing the connection object to the first queue as the SSL protocol connection enters handshake phase processing;
    queuing the connection object to the second queue when the SSL protocol connection enters data transmission phase processing; and
    dropping the connection object from said first queue or said second queue when a time between receiving successive client packets associated with the connection exceeds a specified maximum allowable gap time.

16. The computer-readable storage medium according to claim 15 wherein the instructions, when executed by the one or more processors, further cause the one or more processors to perform placing a timestamp on said connection object upon entering a handshake portion of SSL protocol processing.

17. The computer-readable storage medium according to claim 15 wherein the instructions, when executed by the one or more processors, further cause the one or more processors to perform placing a connection pointer to said connection object at a head of said first queue.

18. The computer-readable storage medium according to claim 15 wherein the instructions, when executed by the one or more processors, further cause the one or more processors to perform allowing a particular connection in said first queue to proceed to said second queue based on one or more user-configured handshake gap time values.

19. The computer-readable storage medium according to claim 15 wherein the-instructions which when executed cause generating a first queue for handshake state connections comprise instructions which when executed cause:
receiving information defining a maximum depth of the first queue; and
receiving information defining a maximum gap time between packet transmissions in the handshake state.

20. The computer-readable storage medium according to claim 15 wherein the instructions which when executed cause generating a second queue for data transmission state connections comprise instructions which when executed cause:
receiving information defining a maximum depth of the second queue; and
receiving information defining a gap time between packet transmissions in the data transmission state.

21. The computer-readable storage medium according to claim 16 wherein the instructions which when executed cause placing the timestamp on said connection object comprise instructions which when executed cause obtaining a start time value when a first connection object is received at a head of the first queue.

22. The computer-readable storage medium according to claim 15 wherein the instructions, when executed by the one or more processors, further cause the one or more processors to perform:
placing a timestamp on said connection object upon entering a handshake portion of SSL protocol processing, wherein placing the timestamp on said connection object comprises obtaining a start time value when a first connection object is received at a head of the first queue; and
when additional packets associated with the connection are received:
updating the start time value; and
repositioning a connection pointer associated with the connection object to the head of the corresponding queue.

23. The computer-readable storage medium according to claim 22 wherein the instructions, when executed by the one or more processors, further cause the one or more processors to perform:
periodically surveying said first and second queues from tail to head; and
determining a connection transmission gap value comprising the difference between the current time value said start time value.

24. The computer-readable storage medium according to claim 18 wherein the-instructions which when executed cause allowing a connection to proceed from the first queue to the second queue comprise instructions which when executed cause:
comparing a user-configured handshake gap time value with a transmission gap value of said connection; and
if said connection transmission gap value is less than said user-configured gap time value, allowing the connection to proceed to said second queue.

25. The computer-readable storage medium according to claim 18 wherein the-instructions which when executed cause dropping a connection comprise instructions which when executed cause:
comparing a user-configured gap time value with a transmission gap value of said connection; and
if said connection transmission gap value is greater than said user-configured gap time value, dropping the connection.

26. The computer-readable storage medium according to claim 15 wherein the-instructions which when executed cause dropping the connection comprise instructions which when executed cause issuing a fatal alert.

27. The computer-readable storage medium according to claim 15, wherein the instructions, when executed by the one or more processors, further cause the one or more processors to perform:
determining when said first queue is full;
dropping the least used connection in the first queue;
if no connections exist in said first queue, determining when said second queue is full;
dropping the least used connection in the second queue.

28. The computer-readable storage medium of claim 27 wherein the instructions which when executed cause determining when said queues are full comprise instructions which when executed cause comparing a specified depth value with a number of connection objects in said queues.

29. An apparatus for preventing denial-of-service attacks in Secure Sockets Layer ("SSL") protocol comprising:
one or more processors;
means for generating a first queue that is dedicated to handling only SSL connections that are in the handshake state;
means for generating a second queue that is dedicated to handling only SSL connections that are in the data transmission state;
means for receiving data associated with an SSL protocol connection from a client;
means for creating a connection object associated with said data;
means for queuing the connection object to the first queue as the SSL protocol connection enters handshake phase processing;
means for queuing the connection object to the second queue when the SSL protocol connection enters data transmission phase processing; and
means for dropping the connection object from said first queue or said second queue when a time between receiving successive client packets associated with the connection exceeds a specified maximum allowable gap time.

30. An apparatus for preventing denial-of-service attacks in Secure Sockets Layer ("SSL") protocol comprising:
a network interface coupled to a network for receiving command-line interface information therefrom;
one or more processors communicatively coupled to the network interface and configured to receive information therefrom;
one or more stored sequences of instructions for preventing denial-of-service attacks in Secure Sockets Layer ("SSL") protocol, and which, when executed by the one or more processors, cause the one or more processors to perform:
generating a first queue that is dedicated to handling only SSL connections that are in the handshake state;
generating a second queue that is dedicated to handling only SSL connections that are in the data transmission state;
receiving data associated with an SSL protocol connection from a client;
creating a connection object associated with said data;

queuing the connection object to the first queue as the SSL protocol connection enters handshake phase processing;

queuing the connection object to the second queue when the SSL protocol connection enters data transmission phase processing; and dropping the connection object from said first queue or said second queue when a time between receiving successive client packets associated with the connection exceeds a specified maximum allowable gap time.

31. The apparatus as recited in claim 29 further comprising means for placing a timestamp on said connection object upon entering a handshake portion of SSL protocol processing.

32. The apparatus as recited in claim 29 further comprising means for placing a connection pointer to said connection object at a head of said first queue.

33. The apparatus as recited in claim 29 further comprising means for allowing a particular connection in said first queue to proceed to said second queue based on one or more user-configured handshake gap time values.

34. The apparatus as recited in claim 29 wherein the means for generating a first queue for handshake state connections comprises:

means for receiving information defining a maximum depth of the first queue; and means for receiving information defining a maximum gap time between packet transmissions in the handshake state.

35. The apparatus as recited in claim 29 wherein the means for generating a second queue for data transmission state connections comprises:

means for receiving information defining a maximum depth of the second queue; and means for receiving information defining a maximum gap time between packet transmissions in the data transmission state.

36. The apparatus as recited in claim 29, further comprising:

means for placing a timestamp on said connection object upon entering a handshake portion of SSL protocol processing, wherein means for placing the timestamp on said connection object comprises means for obtaining a start time value when a first connection object is received at a head of the first queue;

means for updating the start time value when additional packets associated with the connection are received; and means for repositioning a connection pointer associated with the connection object to the head of the corresponding queue when additional packets associated with the connection are received.

37. The apparatus as recited in claim 36, further comprising:

means for periodically surveying said first and second queues from tail to head; and means for determining a connection transmission gap value comprising the difference between the current time value and said start time value.

38. The apparatus as recited in claim 33 wherein the means for allowing a connection to proceed from the first queue to the second queue comprises:

means for comparing a user-configured handshake gap time value with a transmission gap value of said connection; and means for allowing the connection to proceed to said second queue, if said connection transmission gap value is less than said user-configured gap time value.

39. The apparatus as recited in claim 33 wherein the means for dropping a connection comprises:

means for comparing a user-configured gap time value with a transmission gap value of said connection; and means for dropping the connection, if said connection transmission gap value is greater than said user-configured gap time value.

40. The apparatus as recited in claim 29, further comprising:

means for determining when said first queue is full;

means for dropping the least used connection in the first queue;

means for determining when said second queue is full, if no connections exist in said first queue; and means for dropping the least used connection in the second queue.

41. The apparatus as recited in claim 40, wherein the means for determining when said queues are full comprises means for comparing a specified depth value with a number of connection objects in said queues.

42. The apparatus as recited in claim 30, wherein the sequences of instructions comprise further instructions which when executed by the one or more processors cause allowing a particular connection in said first queue to proceed to said second queue based on one or more user-configured handshake gap time values.

43. The apparatus as recited in claim 30, wherein the instructions which when executed cause generating a first queue for handshake state connections comprise instructions which when executed cause:

receiving information defining a maximum depth of the first queue; and receiving information defining a maximum gap time between packet transmissions in the handshake state.

44. The apparatus as recited in claim 30, wherein the instructions which when executed cause generating a second queue for data transmission state connections comprise instructions which when executed cause:

receiving information defining a maximum depth of the second queue;

receiving information defining a maximum gap time between packet transmissions in the data transmission state.

45. The apparatus as recited in claim 30 wherein the sequences of instructions comprise further instructions which when executed by the one or more processors cause:

placing a timestamp on said connection object upon entering a handshake portion of SSL protocol processing, wherein placing the timestamp on said connection object comprises obtaining a start time value when a first connection object is received at a head of the first queue; and when additional packets associated with the connection are received:

updating the start time value; and repositioning a connection pointer associated with the connection object to the head of the corresponding.

46. The apparatus as recited in claim 45, wherein the sequences of instructions comprise further instructions which when executed by the one or more processors cause:

periodically surveying said first and second queues from tail to head; and determining a connection transmission gap value comprising the difference between the current time value and said start time value.

47. The apparatus as recited in claim 42, wherein the instructions which when executed cause allowing a connection to proceed from the first queue to the second queue comprise instructions which when executed cause:

comparing a user-configured gap time value with a transmission gap value of said connection; and if said connection transmission gap value is less than said user-configured gap time value, allowing the connection to proceed to said second queue.

48. The apparatus as recited in claim 42, wherein the instructions which when executed cause dropping a connection comprise instructions which when executed cause:

comparing a user-configured gap time value with a transmission gap value of said connection; and if said connection transmission gap value is greater than said user-configured gap time value, dropping the connection.

49. The apparatus as recited in claim 30, wherein the sequences of instructions comprise further instructions which when executed by the one or more processors cause:

determining when said first queue is full;

dropping the least used connection in the first queue;

if no connections exist in said first queue, determining when said second queue is full; and dropping the least used connection in the second queue.

50. The apparatus as recited in claim 49, wherein the instructions which when executed cause determining when said queues are full comprises instructions which when executed cause comparing a specified depth value with a number of connection objects in said queues.

* * * * *